United States Patent [19]

Sakaguchi et al.

[11] 4,317,908

[45] Mar. 2, 1982

[54] PROCESS FOR PRODUCING DIOXAZINE VIOLET PIGMENT

[75] Inventors: Iwao Sakaguchi; Yoshiaki Hayashi, both of Toyonaka, Japan

[73] Assignee: Sumitomo Chemical Company, Limited, Osaka, Japan

[21] Appl. No.: 177,515

[22] Filed: Aug. 12, 1980

[30] Foreign Application Priority Data

Aug. 23, 1979 [JP] Japan .................................. 54-108017

[51] Int. Cl.$^3$ ........................................... C07D 498/22
[52] U.S. Cl. ....................................................... 544/74
[58] Field of Search ........................................... 544/74

[56] References Cited

U.S. PATENT DOCUMENTS 2,026,092 12/1935 Kranzlein et al. ............. 544/74 OR
2,066,915 1/1937 Thiess et al. ................... 544/74 OR
2,918,465 12/1959 Lytle et al. ..................... 544/74 OR
3,022,299 2/1962 Schmidt et al. ................ 544/74 OR

OTHER PUBLICATIONS

Herbst, Journal of Paint Technology, vol. 45, No. 579, pp. 39 to 50, (1973).
Hafner, Chem. Abst., vol. 77, Abst. No. 166,240t, (1972).
Hafner, Chem. Abst., vol. 82, Abst. 18683c, (1975).
CIBA Ltd., Chemd. Abst., vol. 57, Abst. of Brit. Patent 892,733, Across Cols. 12671–12672, (1962).

Primary Examiner—John M. Ford
Assistant Examiner—Robert C. Whittenbaugh
Attorney, Agent, or Firm—Cushman, Darby & Cushman

[57] ABSTRACT

Dioxazine violet pigment having a stable crystal form is advantageously produced by heating a mixture containing an aqueous suspension of a metastable dioxazine violet pigment obtainable in a conventional manner and an aromatic compound having a low solubility in water such as benzoic acid. This stable pigment is useful as a paint and excellent in tinting strength, gloss and dispersibility.

18 Claims, 3 Drawing Figures

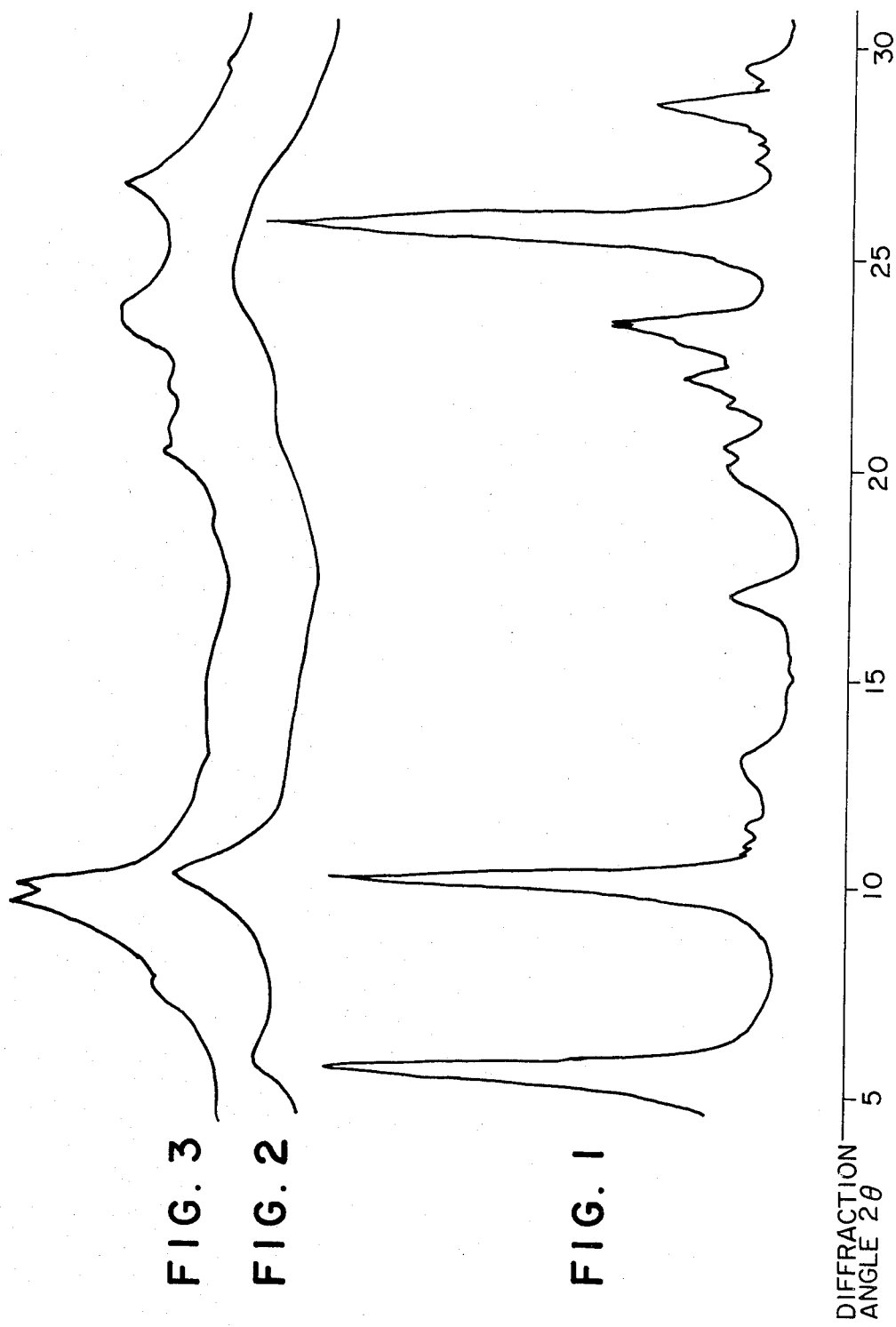

PROCESS FOR PRODUCING DIOXAZINE VIOLET PIGMENT

The present invention relates to a process for producing a dioxazine violet pigment. More specifically, it relates to a process for pigmentation of a crude dioxazine violet obtainable in a conventional manner to produce a final product, dioxazine violet pigment (C.I. Pigment Violet 23), having a stable crystal form.

As to the pigmentation of crude dioxazine violet, there have heretofore been known a wet or dry pulverization method wherein the crude dioxazine violet is treated by means of kneader or ball mill using a large amount of inorganic salts or balls, respectively, an acid slurry method with use of 60 to 90% sulfuric acid (Japanese Published Examined Patent Application No. 16786/1964), a slurry method with use of an aromatic sulfonic acid (West German Patent No. 946,560), a paste method with use of a halogenated acetic acid (Japanese Published Unexamined Patent Application No. 935/1977), and so on.

In these known methods, however, various problems remains unsolved. For example, according to the pulverization method, a large amount of inorganic salts or balls must be used, and therefore the amount per batch of the feeding crude material is inevitably decreased, so that the productivity is lowered, and moreover it is necessary to recover the used inorganic salts after the pigmentation.

According to the acid slurry method, the concentration of sulfuric acid and the temperature at which the treatment is carried out must be controlled exactly, and the resulting pigment has, as described in Japanese Published Examined Patent Application No. 32179/1973, a metastable α-type crystal form (the characteristics are found in 5.8°, 10.2° and 24.4° at $2\theta$ in the diffraction angle, and this crystal form is hereinafter referred to as α-form), which is higher in the energy level, more sensitive to bring about the crystal transformation and inferior in a migration resistance or the like, as compared with a stable form (the characteristics are found in 5.7°, 10.2°, 17.1°, 23.4° and 28.6° at $2\theta$ in the diffraction angle, and this crystal form is hereinafter referred to as β-form). According to the slurry method and the paste method, chemicals to be used are expensive and difficult to be recovered after the pigmentation, and particularly in the paste method, the obtainable pigment has found not to be the β-form but an α-form analogue (the characteristics are found in 9.6°, 10°, 23.5° and 26.7° at $2\theta$ in the diffraction angle).

The present inventors have earnestly studied to develope an effective process for pigmentation to obtain a stable β-form dioxazine violet pigment, and as a result, found that the stable β-form pigment can be produced by heat-treating a mixture comprising an aqueous suspension of dioxazine violet pigment of α-form or a crystal form analogous thereto and an aromatic compound having a low solubility in water.

The present invention provides a process for producing a stable dioxazine violet pigment, which comprises mixing an aqueous suspension of a metastable dioxazine violet pigment with an aromatic compound having a low solubility in water, and then heating the mixture.

In the present invention, the metastable dioxazine violet pigment means a dioxazine violet pigment having α-form or a crystal form analogous thereto.

In the accompanying drawings

Each FIG. 1, 2 and 3 shows an X-ray diffraction diagram of β-form pigment obtained in Example 1, of α-form pigment obtained in Synthesis Example 1 and of a pigment of a crystal form analogous to α-form obtained in Synthesis Example 3, respectively.

The process of the present invention is explained in detail as follows.

The metastable dioxazine violet pigment usable in the present invention as a starting material can be obtained in accordance with the process described in, for example, Japanese Published Examined Patent Application No. 16786/1964, or Japanese Published Unexamined Patent Application No. 935/1977. The process described in the Japanese Published Examined Patent Application No. 16786/1964 comprises sulfonating an aromatic hydrocarbon in concentrated sulfuric acid, subsequently adjusting the concentration of sulfuric acid to 60 to 90%, adding crude dioxazine violet thereto, heating the resulting mixture while stirring to obtain the sulfuric acid salt, hydrolyzing the salt and then separating the desired pigment from the aqueous mixture thereof. The thus obtained pigment is of α-form as shown in FIG. 2. Further, a pigment obtained through the above procedures, provided that a slurry is formed in 60 to 90% sulfuric acid without use of the benzenoid hydrocarbon, is also of α-form and usable in the present invention as the starting material.

While, the process described in the Japanese Published Unexamined Patent Application No. 935/1977 comprises dissolving the crude dioxazine violet in a halogenated acetic acid and then subjecting the solution to recrystallization using water or a water-soluble solvent. The thus obtained pigment is not of β-form, but a crystal form analogous to the α-form as shown in FIG. 3.

The metastable dioxazine violet pigment thus obtained is suspended in water. The amount of water is 5 to 20 times, preferably 8 to 12 times the weight of the starting pigment. It is preferred from industrial point of view to neutralize the resulting slurry or paste by direct addition of an alkali (e.g. sodium hydroxide, potassium hydroxide).

The aromatic compound of low solubility in water is then added to the slurry or paste in an amount of 5 to 150% by weight, preferably 10 to 50% by weight based on the weight of the starting pigment. The aromatic compounds usable in the present invention are those which have a solubility in water of 10% by weight or less, preferably 5% by weight or less, and include, for example, solvents such as benzene, nitrobenzene, chlorobenzene, dichlorobenzene, toluene, xylene and the like, acids such as phenol, cresol, naphthol, phthalic acid, benzoic acid and the like, and bases such as aniline, toluidine, quinoline and the like. Of these, benzoic acid is most preferred in consideration of the amount to be used and the treating period of time. It is preferred to control the pH of the mixture from 2 to 6 when the acids are used and from 8 to 12 when the bases are used.

The resulting mixture is heat-treated at a temperature of 90° to 130° C., preferably 95° to 115° C., usually for one to ten and several hours, preferably 3 to 10 hours. The heat-treatment can be carried out, if desired, under increased pressure.

After the heat-treatment is over, the desired pigment can easily be isolated by steam distillation or filtration after solubilizing the used aromatic compound with the aid of acids (e.g. hydrochloric acid, sulfuric acid, acetic acid) or alkalis (e.g. sodium hydroxide, potassium hydroxide).

The pigment thus obtained in accordance with the process of the present invention is not of α-form or a crystal form analogous to the α-form, but of β-form as shown in FIG. 1, which is equal to that of the pigment obtained by the aforesaid conventional pulverization method.

The β-form dioxazine violet pigment thus obtained is markedly superior in tinting strength, gloss, dispersibility and the like to the metastable pigment. In accordance with the present invention, the dioxazine violet pigment free from the problem in respect of migration resistance and stable in the crystal form and the quality can be easily produced under widely selectable conditions without troublesome operations such as exact control of the concentration of sulfuric acid and the temperature at which the pigmentation is carried out as seen in the aforesaid slurry method.

The aromatic compound of a low solubility in water usable in the process of the present invention is excellent in the crystal transition effect, whereas it was found that other compounds of a high solubility in water, such as, for example, water soluble solvents (acetone, methanol, ethanol, etc.) as used in the process of the aforesaid Japanese Patent Application No. 953/1977, and sulfonic acids of benzenoid hydrocarbons as used in the process of the aforesaid Japanese Patent Application No. 16786/1964, exhibit no effect of the crystal transition of the β-form.

The pigment thus obtained in present invention is used in plastics (e.g. polyvinyl chloride, polyolefins, polystyrene, rubber), inks (e.g. gravure inks, flexographic inks, offset inks) or paints (e.g. amino-alkyd paints, air drying alkyd paints, thermoset acryl paints).

The present invention is explained in more detail with reference to Examples and Synthesis Examples, which are not intended to limit the scope of the present invention. In Examples, parts and % are by weight.

Synthesis of metastable dioxazine violet pigment

Synthesis Example 1

20 Parts of crude dioxazine violet (C.I. Pigment Violet 23) was added to 300 parts of 78% sulfuric acid, and the resulting mixture was stirred at 50° C. for 5 hours, and then poured into 3000 parts of water. The product was separated by filtration, washed with water and then dried to obtain 19.6 parts of α-form dioxazine violet pigment. The X-ray diffraction thereof was as shown in FIG. 2.

Synthesis Example 2

To 200 parts of 95% sulfuric acid was added 40 parts of toluene, and the mixture was stirred at 40° C. for 1 hour. After the toluene and sulfuric acid formed a single layer, 31.3 parts of water was gradually added dropwise thereto to adjust the concentration of sulfuric acid to 85%. 20 Parts of crude dioxazine violet was added thereto and the resulting mixture was stirred at room temperature for 4 hours, and then poured into 2000 parts of water. The product was separated by filtration, washed with water and then dried to obtain 19.6 parts of the same α-form pigment as that in Synthesis Example 1.

Synthesis Example 3

10 Parts of crude dioxazine violet was added to 80 parts of dichloroacetic acid, and the mixture was stirred at 50° C. for 2 hours to form a solution and then poured into 500 parts of methanol. The product was separated by filtration, washed with water and then dried to obtain 9.8 parts of pigment having a crystal form analogous to α-form. The X-ray diffraction thereof was as shown in FIG. 3.

Production of stable dioxazine violet pigment

Example 1

10 Parts of the α-form pigment obtained in Synthesis Example 1 was suspended in 150 parts of water, and the pH was adjusted to 3.1. 5 Parts of benzoic acid was added thereto, and the resulting mixture was stirred at 95° to 97° C. for 5 hours. Successively, the pH of the mixture was adjusted to 8.5 by adding 20% sodium hydroxide solution, thereby solubilizing the benzoic acid. The product was separated by filtration, washed with water and then dried to obtain 9.8 parts of β-form dioxazine violet pigment. The X-ray diffraction thereof was as shown in FIG. 1.

When used for an amino-alkyd paint, this pigment was superior in gloss and titing strength by 20% to the α-form pigment obtained in Synthesis Example 1.

Examples 2 to 7

10 Parts of the α-form pigment obtained in Synthesis Example 2 was suspended in 200 parts of water, and the mixture was treated under the following conditions, whereby each β-form pigment similar to that of Example 1 was obtained.

| Example No. | Aromatic compound added (part) | | Treating temperature (°C.) | Treating time (hr) |
|---|---|---|---|---|
| 2 | Benzene | 6 | 115 | 10 |
| 3 | Quinoline | 5 | 90 | 6 |
| 4 | Phenol | 5.2 | 100 | 7 |
| 5 | Dichlorobenzene | 4 | 105 | 5 |
| 6 | Benzoic acid | 3 | 100 | 4 |
| 7 | Toluene | 4.6 | 110 | 10 |

Example 8

8 Parts of the pigment having a crystal form analogous to α-form obtained in Synthesis Example 3 was suspended in 80 parts of water, and after adjusting the pH to 4, 2 parts of benzoic acid was added thereto. The resulting mixture was stirred in an autoclave at 115° to 120° C. for 2 hours. After adjusting the pH to 7.8, the resulting mixture was filtered to separate the product, which was then washed with water and dried. Thus, 7.5 parts of β-form pigment similar to that of Example 1 was obtained.

Example 9

To 300 parts of 82% sulfuric acid was added 15 parts of crude dioxazine violet, and the mixture was stirred at room temperature for 4 hours. Thereafter, 1000 parts of 20% sodium hydroxide solution was added dropwise thereto while cooling the mixture, whereby the pH was adjusted to 2.5. Successively, 4 parts of benzoic acid was added thereto, and the resulting mixture was stirred at 100° to 105° C. for 5 hours. After adjusting the pH to 8.0, the mixture was filtered to separate the product, which was then washed with water and dried, whereby there was obtained 14 parts of β-form pigment similar to that of Example 1.

When used for coloring a polyvinyl chloride resin, this pigment was superior in dispersibility and tinting strength by 25% to the α-form pigment obtained in Synthesis Example 1.

What is claimed is:

1. A process for producing a stable dioxazine violet pigment, which comprises mixing an aqueous suspension of a metastable dioxazine violet pigment with an aromatic compound having a low solubility in water, and then heating the mixture.

2. The process according to claim 1, wherein the metastable dioxazine violet pigment is obtained by mixing crude dioxazine violet with 60 to 90% sulfuric acid to form the sulfate, and then hydrolyzing the sulfate.

3. The process according to claim 1, wherein the metastable dioxazine violet is obtained by sulfonating an aromatic hydrocarbon in concentrated sulfuric acid, successively adjusting the concentration of the sulfuric acid to 60 to 90%, then adding crude dioxazine violet thereto to form a sulfate, and hydrolyzing the sulfate.

4. The process according to claim 1, wherein the metastable dioxazine violet pigment is obtained by dissolving crude dioxazine violet in a halogenated acetic acid and then subjecting the solution to recrystallization.

5. The process according to claim 1, wherein the aromatic compound is a member selected from benzene, nitrobenzene, chlorobenzene, dichlorobenzene, toluene, xylene, phenol, cresol, naphthol, phthalic acid, benzoic acid, aniline, toluidine and quinoline.

6. The process according to claim 1, wherein the aromatic compound is used in an amount of 5 to 150% by weight based on the weight of the metastable dioxazine violet pigment.

7. The process according to claim 1, wherein the water content in the aqueous suspension is 5 to 20 times the weight of the metastable dioxazine violet pigment.

8. The process according to claim 1, wherein the heating is effected at a temperature of 90° to 130° C.

9. A stable dioxazine violet pigment produced by the process of claim 1.

10. The process according to claim 5 wherein the aromatic compound is benzoic acid.

11. The process of claim 7 wherein the water content in the aqueous suspension is 8 to 12 times the weight of the metastable dioxazine violet pigment.

12. The process of claim 1 wherein the compound having a low solubility in water has a solubility of not over 10% by weight.

13. The process of claim 12 wherein the compound having a low solubility in water has a solubility of not over 5% by weight.

14. The process of claim 1 wherein the heating is at 90°–130° C.

15. The process according to claim 1 which consists essentially of mixing an aqueous suspension of a metastable dioxazine violet pigment with an aromatic compound having a low solubility in water and then heating the mixture.

16. The process according to claim 15 wherein the water content in the aqueous suspension is 5 to 20 times the weight of the metastable dioxazine violet pigment.

17. The process of claim 16 wherein the aromatic compound is benzoic acid.

18. The process of claim 16 wherein the heating is at 90° to 130° C.

* * * * *